(12) United States Patent
Sasaki et al.

(10) Patent No.: US 10,471,858 B2
(45) Date of Patent: Nov. 12, 2019

(54) VEHICLE SEAT

(71) Applicant: NHK SPRING CO., LTD., Yokohama-shi, Kanagawa (JP)

(72) Inventors: Tetsuya Sasaki, Yokohama (JP); Yukihiro Hakuta, Yokohama (JP); Shigeo Fujii, Yokohama (JP); Tomoyuki Sato, Yokohama (JP); Daichi Takigawa, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/900,378

(22) Filed: Feb. 20, 2018

(65) Prior Publication Data

US 2018/0244179 A1  Aug. 30, 2018

(30) Foreign Application Priority Data

Feb. 27, 2017  (JP) .................. 2017-035073

(51) Int. Cl.
*B60N 2/12* (2006.01)
*B60N 2/30* (2006.01)
(Continued)

(52) U.S. Cl.
CPC .............. *B60N 2/305* (2013.01); *B60N 2/10* (2013.01); *B60N 2/12* (2013.01); *B60N 2/14* (2013.01); *B60N 2/146* (2013.01); *B60N 2/3011* (2013.01)

(58) Field of Classification Search
CPC ... B60N 2/10; B60N 2/12; B60N 2/14; B60N 2/146
(Continued)

(56) References Cited

U.S. PATENT DOCUMENTS 5,257,852 A * 11/1993 Tsuneki ................. A47C 1/121
  188/291
6,773,068 B2 * 8/2004 Shinozaki .......... B60N 2/01583
  297/344.1
(Continued)

FOREIGN PATENT DOCUMENTS

JP    H09-071166 A    3/1997
JP    2005-053246 A    3/2005

OTHER PUBLICATIONS

Japanese Office Action dated May 14, 2019 in Japanese Patent Application No. 2017-035073 in 5 pages (English translation included).

*Primary Examiner* — Dennis H Pedder
(74) *Attorney, Agent, or Firm* — Knobbe, Martens, Olson & Bear, LLP (57) ABSTRACT

A vehicle seat that includes: a support bracket that is provided at a floor of a vehicle; a rotation bracket that is coupled to the support bracket; a lock member that is provided at the floor; a lower rail being fixed to the rotation bracket and being locked by the lock member; an upper rail that is attached to the lower rail so as to be capable of sliding in a vehicle front-rear direction; a seat body that is fixed to the upper rail; a rotation force application member that applies rotation force to the rotation bracket such that the lower rail rotates in a direction in which the seat body springs up; and a speed reduction member that reduces a rotation speed of the rotation bracket in a case in which the seat body springs up.

7 Claims, 8 Drawing Sheets

(51) Int. Cl.
*B60N 2/14* (2006.01)
*B60N 2/10* (2006.01)

(58) Field of Classification Search
USPC .................. 296/65.05, 65.08; 297/325, 326, 297/331–333, 335, 336
See application file for complete search history.

(56) References Cited

U.S. PATENT DOCUMENTS

| | | | | |
|---|---|---|---|---|
| 7,108,306 B2 * | 9/2006 | Suda | ................... | B60N 2/0232 296/65.08 |
| 7,597,389 B2 * | 10/2009 | Kojima | ................ | B60N 2/3011 188/290 |
| 8,360,496 B2 * | 1/2013 | Farcas | .................. | B60N 2/3065 296/65.09 |

* cited by examiner

WHEN SPRINGING UP

FIG.8

WHEN LOCKING TO FLOOR

VEHICLE SEAT

CROSS-REFERENCE TO RELATED APPLICATION

This application is based on and claims priority under 35 USC 119 from Japanese Patent Application No. 2017-035073 filed on Feb. 27, 2017, the disclosure of which is incorporated by reference herein.

BACKGROUND

Technical Field

The present disclosure relates to a vehicle seat.

Related Art

A vehicle bench seat described in Japanese Patent Application Laid-Open (JP-A) No. H09-71166 is coupled to lower rails, and is capable of sliding in a vehicle front-rear direction above the lower rails. The lower rails and the vehicle bench seat are capable of rotating as a unit about seat hinges located at a front end of the lower rails.

The force required to rotate the vehicle bench seat described in JP-A No. H09-71166 differs between cases in which the vehicle bench seat is at a slide position toward the rear of the lower rail and cases in which the vehicle bench seat is at a slide position toward the front of the lower rail. Namely, when the vehicle bench seat is toward the rear, the position of the center of gravity of the vehicle bench seat is positioned further from the seat hinges than when the vehicle bench seat is toward the front. Accordingly, a greater force is required in order to rotate the vehicle bench seat, making the vehicle bench seat more difficult to rotate.

SUMMARY

In consideration of the above circumstances, an object of the present disclosure is to provide a vehicle seat in which a seat body can be rotated with a light force, regardless of the position of the seat body.

An aspect of the present disclosure is a vehicle seat comprising: a support bracket that is provided at a floor of a vehicle; a rotation bracket that is rotatably coupled to the support bracket; a lock member that is provided at the floor; a lower rail, a front end portion of the lower rail being fixed to the rotation bracket and a rear end portion of the lower rail being locked by the lock member; an upper rail that is attached to the lower rail so as to be capable of sliding in a vehicle front-rear direction; a seat body that is fixed to the upper rail; a rotation force application member that applies rotation force to the rotation bracket such that the lower rail rotates in a direction in which the seat body springs up; and a speed reduction member that reduces a rotation speed of the rotation bracket in a case in which the seat body springs up.

BRIEF DESCRIPTION OF DRAWINGS

Exemplary embodiments of the present invention will be described in detail based on the following figures, wherein.

DESCRIPTION OF EMBODIMENTS

Vehicle Seat

Figure 1:
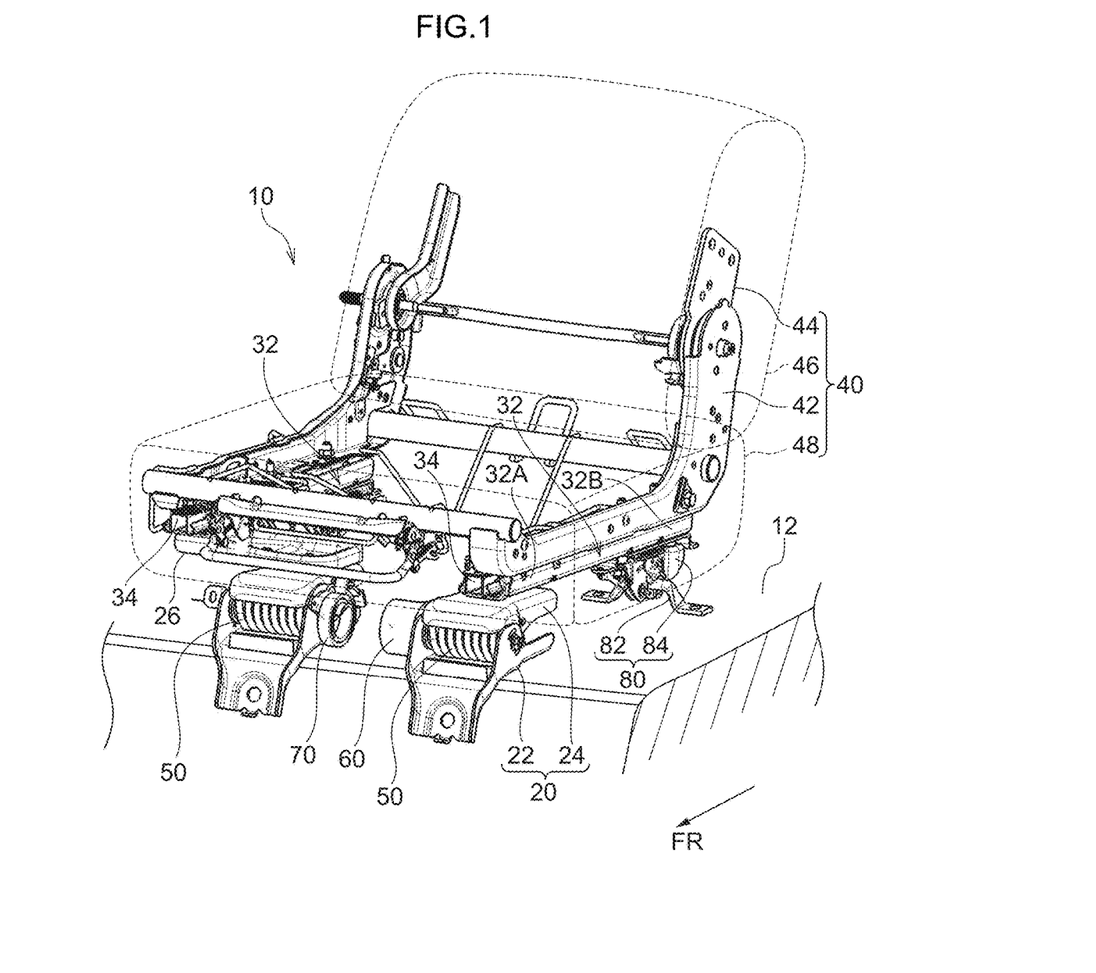
FIG. 1 is a perspective view illustrating a vehicle seat according to an exemplary embodiment of the present disclosure in a state viewed from above.
Figure 2:
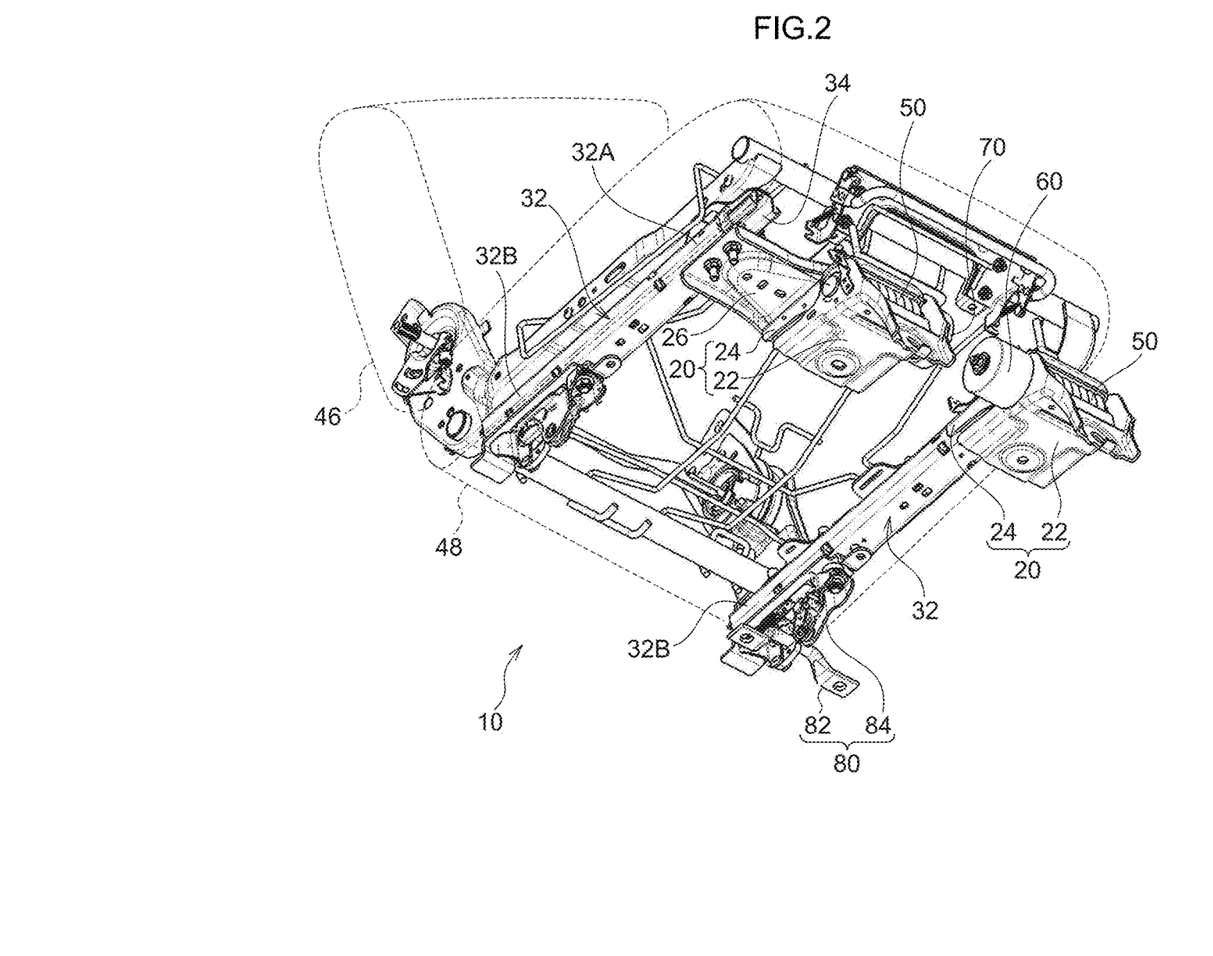
FIG. 2 is a perspective view illustrating a vehicle seat according to an exemplary embodiment of the present disclosure in a state viewed from below.

As illustrated in FIG. 1 and FIG. 2, a vehicle seat 10 according to an exemplary embodiment of the present disclosure includes support brackets 22, rotation brackets 24, lock members 80, lower rails 32, upper rails 34, a seat body 40, main power springs 50, and a rotary damper 60. The support brackets 22 are fixed to a floor 12 of the vehicle. The rotation brackets 24 are rotatably coupled to the respective support brackets 22. The lock member 80 is provided to the floor 12. A front end portion 32A of each lower rail 32 is fixed to the corresponding rotation bracket 24 and a rear end portion 32B of each lower rail 32 is locked by the lock member 80. Each upper rail 34 is attached to the corresponding lower rail 32 so as to be capable of sliding in a vehicle front-rear direction, and can be made to stop at a predetermined position. The seat body 40 is fixed to the upper rails 34. The main power springs 50 apply rotation force to the rotation brackets 24 such that the lower rails 32 rotate in a direction in which the seat body 40 springs upward. The rotary damper 60 reduces the rotation speed of the rotation brackets 24 as the seat body 40 springs upward.

Note that in the following explanation, the support brackets 22 and the rotation brackets 24 are also referred to collectively as the brackets 20. In FIG. 1 and FIG. 2, in order to aid understanding of the configuration of the vehicle seat 10, a seatback 46 and a seat cushion 48 configuring the seat body 40 are illustrated by dashed lines.

The brackets 20, the lower rails 32, and the upper rails 34 are provided in pairs below the seat body 40, with one of each on each side of the seat body 40 in a vehicle width direction (width direction of the seat body 40). As will be described in detail later, the support brackets 22 and the rotation brackets 24 configuring the brackets 20 are respectively coupled together through a rotation pin 23 (see FIG. 5). The main power spring 50, serving as an example of a rotation force application member of the present disclosure, and either the rotary damper 60, serving as an example of a speed reduction member of the present disclosure, or a spiral spring 70, serving as an example of a rotation force reduction member of the present disclosure, are provided around the axis of the rotation pin 23.

Note that the main power springs 50 are provided to each of the pair of brackets 20, and each of the pair of brackets 20 is provided with either the rotary damper 60 or the spiral spring 70. The rotary damper 60 and the spiral spring 70 are provided facing each other at positions near the center of the seat body 40, and are provided at positions symmetrical to each other about a center line in the width direction of the seat body 40.

Note that the rotary damper 60 and the spiral spring 70 may be provided either at the inner side or the outer side of the pair of brackets 20 (inner side or outer side with respect to the width direction of the seat body 40). However, as in the present exemplary embodiment, both are preferably provided at either the inner side or the outer side since in such cases smooth movement of the seat body 40 is achieved.

Seat Body

The seat body 40 includes a cushion frame 42, the seat cushion 48, a seatback hinge 44, and a seatback 46. The cushion frame 42 is fixed to upper faces of the upper rails 34. The seatback hinge 44 is rotatably coupled to an upper end portion of the cushion frame 42, and the seatback hinge 44 and the seatback 46 rotate together as a unit, enabling the seatback 46 to be folded over onto the seat cushion 48.

Lower Rails, Lock Member

The lock member 80 is provided below the rear end portion 32B of the lower rail 32. The lock member 80 includes a striker 82 that is fixed to the floor 12, and a hook bracket 84 that is fixed to a lower face of the rear end portion 32B of the lower rail 32 and that engages with the striker 82.

A locked state of the rear end portion 32B of the lower rail 32 is released by releasing an engaged state of the hook bracket 84 with the striker 82. Moreover, rotation force of the main power springs 50, described later, rotates the rear end portions 32B of the lower rails 32 in a direction away from the floor 12. The seat body 40 thereby rotates so as to spring up toward the front of the vehicle.

Upper Rails

The upper rails 34 are coupled to the lower rails 32 so as to be capable of sliding in the vehicle front-rear direction, and can be made to stop at a predetermined position by a locking unit.

Figure 3A:
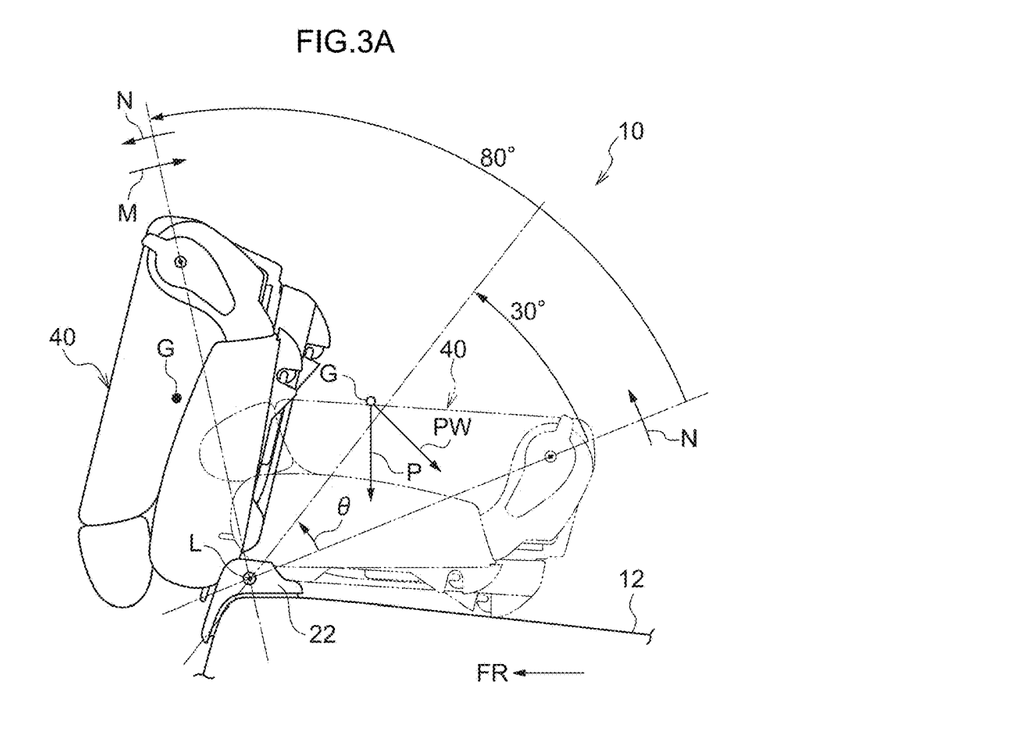
FIG. 3A is a side view illustrating a vehicle seat according to an exemplary embodiment of the present disclosure in a state in which a seat body disposed at a rearmost position has sprung up toward the vehicle front about a rotation axis.

In FIG. 3A, a state prior to the seat body 40 springing up, when the upper rails 34 are stopped at a position furthest toward the rear side (rearmost position), is illustrated by double-dotted dashed lines, and a state after the seat body 40 has sprung up is illustrated by solid lines.

Figure 3B:
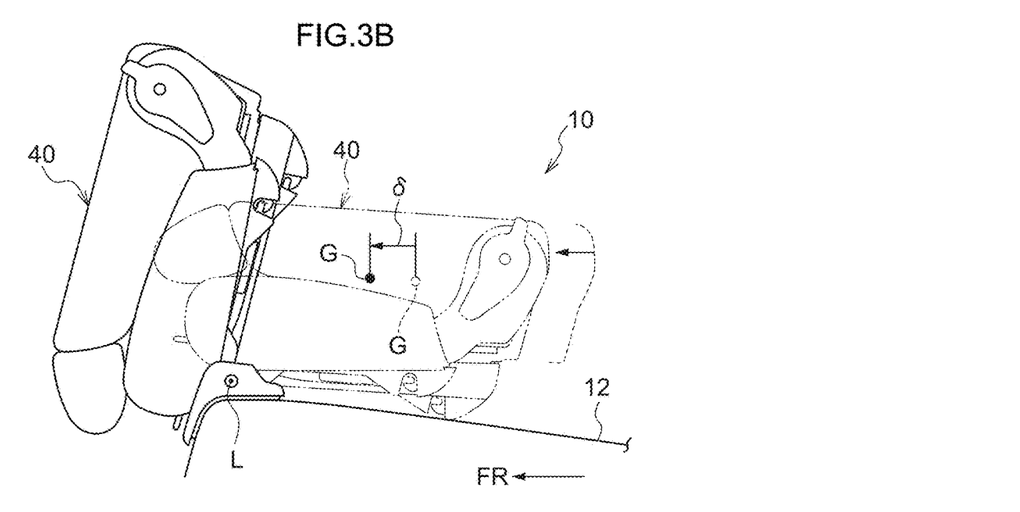
FIG. 3B is a side view illustrating a seat body according to an exemplary embodiment of the present disclosure in a state in which a seat body disposed at a frontmost position has sprung up toward the vehicle front about a rotation axis.

In FIG. 3B, a state prior to the seat body 40 springing up, when the upper rails 34 are stopped at a position furthest toward the front side (frontmost position), is illustrated by double-dotted dashed lines, and a state after the seat body 40 has sprung up is illustrated by solid lines. Moreover, in FIG. 3B, part of the seat body 40 when at the rearmost position is illustrated by dashed lines, and the center of gravity of the seat body 40 when at the frontmost position and the rearmost position respectively is indicated by the letter G (the center of gravity G when at the frontmost position is illustrated by a black circle, and the center of gravity G when at the rearmost position is illustrated by a white circle). As illustrated in FIG. 3B, the rearmost and frontmost positions of the center of gravity G are separated in the seat front-rear direction by an amount S.

Note that FIG. 3A and FIG. 3B are side views of the vehicle seat 10, and the lower rails 32 and the upper rails 34 are not visible due to being hidden by the seat body 40.

Support Bracket, Rotation Bracket

Figure 4:
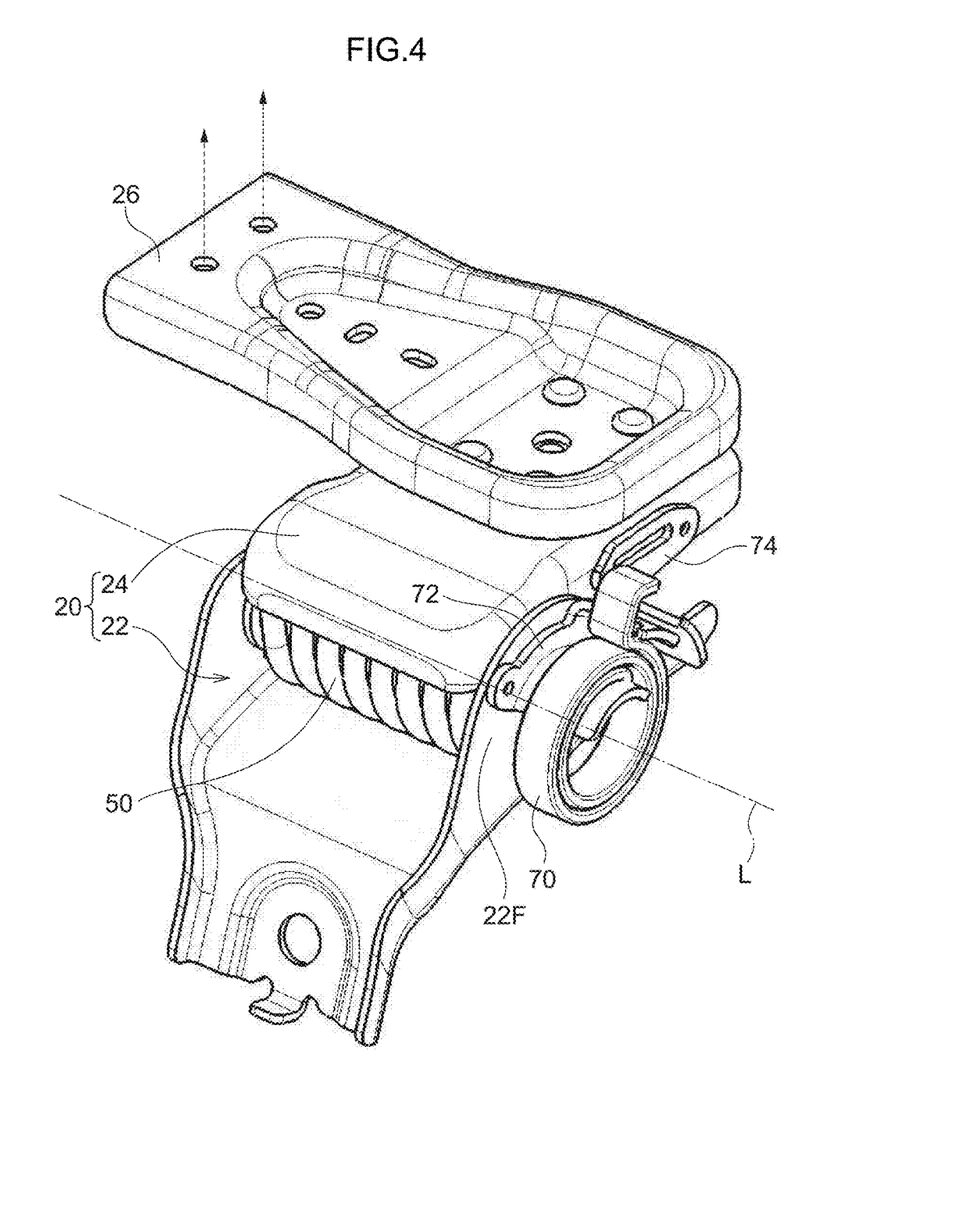
FIG. 4 is a perspective view illustrating an assembled state of a support bracket, a rotation bracket, a main power spring, and a spiral spring in a vehicle seat according to an exemplary embodiment of the present disclosure.

FIG. 4 illustrates an assembled state of the bracket 20 (support bracket 22 and rotation bracket 24), the main power spring 50, and the spiral spring 70. As illustrated in FIG. 4, an extension portion 26 is joined to the bracket 20 assembled with the spiral spring 70, and as illustrated in FIG. 2, the lower face of the lower rail 32 is fixed to an upper face of the extension portion 26. As illustrated in FIG. 1, the lower face of the lower rail 32 is fixed directly to the upper face of the rotation bracket 24 at the bracket 20 assembled with the rotary damper 60.

Figure 5:
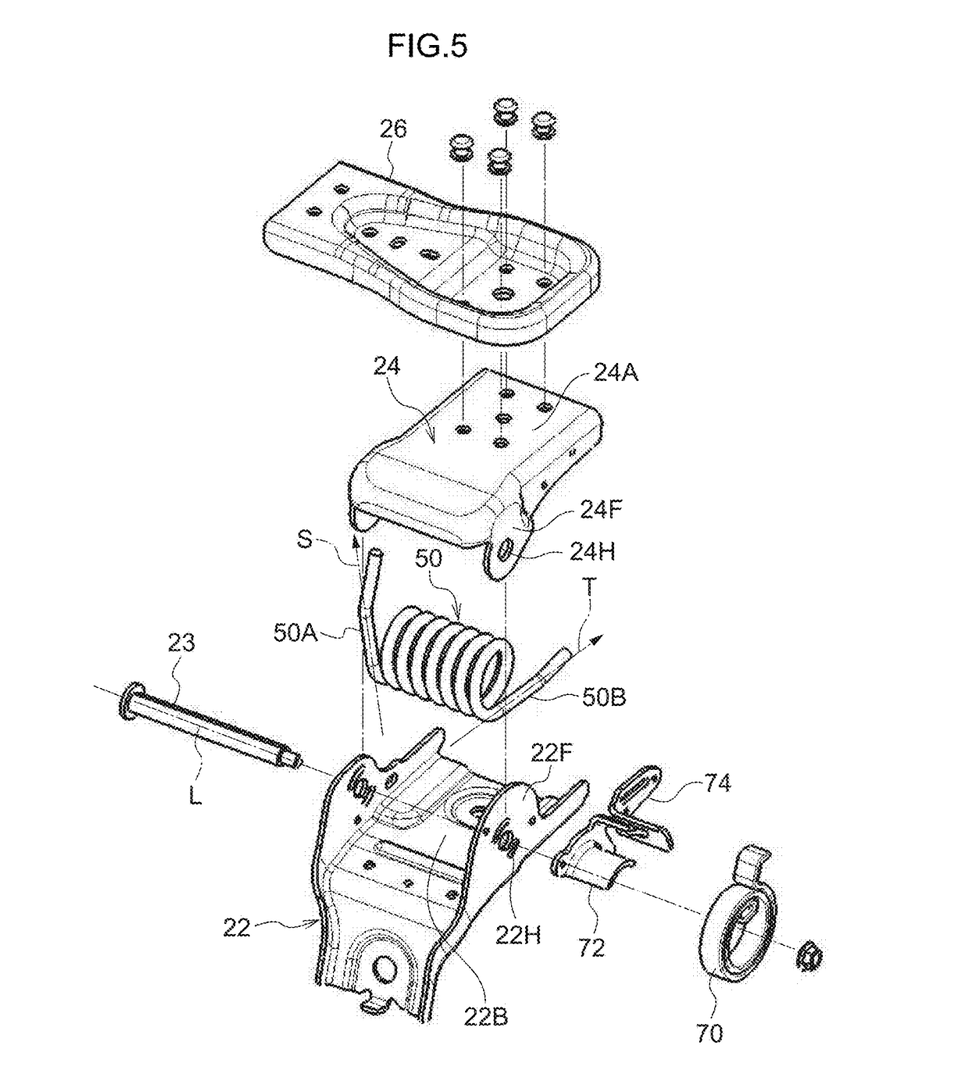
FIG. 5 is a perspective view illustrating a state prior to assembly of a support bracket, a rotation bracket, a main power spring, and a spiral spring in a vehicle seat according to an exemplary embodiment of the present disclosure.

FIG. 5 illustrates a state prior to assembly of the bracket 20 (support bracket 22 and rotation bracket 24), the main power spring 50, and the spiral spring 70. Respective flanges 22F, 24F project from both vehicle width direction ends of a body 22B of the support bracket 22 and a body 24A of the rotation bracket 24 so as to be substantially parallel to each other. The flanges 22F, 24F are respectively formed with through holes 22H, 24H. The rotation pin 23 is inserted into the through holes 22H, 24H, such that the rotation bracket 24 and the rotation pin 23 are capable of rotating as a unit about an axis at the through hole 22H of the support bracket 22 (a center line (axis L) running in an axial direction of the rotation pin 23).

Main Power Spring

The main power spring 50 is a coil spring disposed between the two flanges 24F of the rotation bracket 24. The rotation pin 23 is inserted through the inside of the main power spring 50. In a state in which external force is not being applied to the main power spring 50, two end portions 50A, 50B of the main power spring 50 are formed so as to run in mutually intersecting directions (directions S, T) as viewed along a direction running along the axis L. An angle formed between the directions S and T is set to 80° or greater.

When assembling together the support bracket 22, the rotation bracket 24, the main power spring 50, and the rotation pin 23, the two end portions 50A, 50B of the main power spring 50 are assembled so as to respectively abut the body 24A of the rotation bracket 24 and the body 22B of the support bracket 22.

The main power spring 50 is wound tighter by rotating the support bracket 22 and the rotation bracket 24 relative to each other about the axis L such that the bodies 22B, 24A become substantially parallel to each other. The main power spring 50 therefore attempts to return to its original shape, such that the bodies 22B, 24A of the rotation bracket 24 and the support bracket 22 are biased so as to rotate about the axis L in order to respectively align with the directions S, T.

Figure 6A:
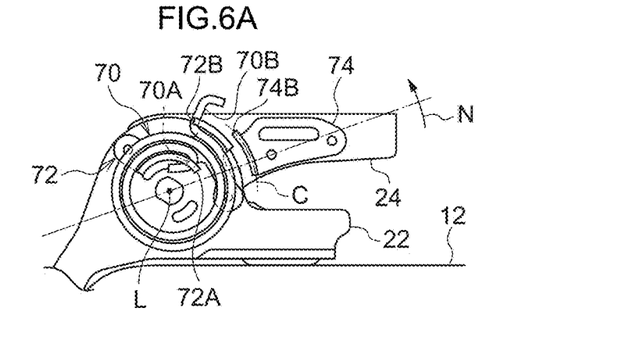
FIG. 6A is a side view illustrating rotation of a rotation bracket of a vehicle seat according to an exemplary embodiment of the present disclosure in a state in which the rotation angle is 0°.
Figure 6B:
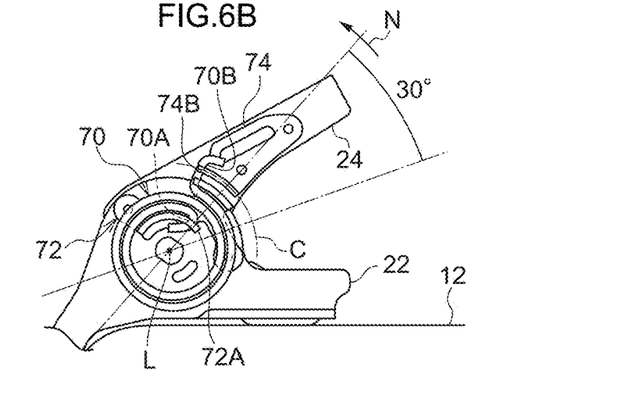
FIG. 6B is a side view illustrating rotation of a rotation bracket of a vehicle seat according to an exemplary embodiment of the present disclosure in a state in which the rotation angle is 30°.
Figure 6C:
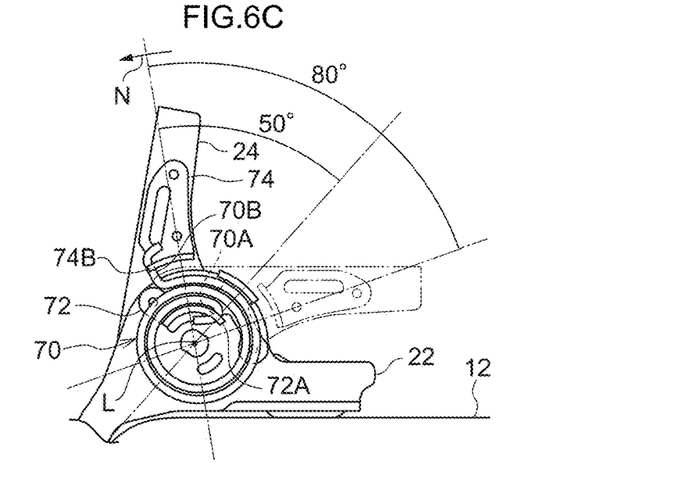
FIG. 6C is a side view illustrating rotation of a rotation bracket of a vehicle seat according to an exemplary embodiment of the present disclosure in a state in which the rotation angle is 80°.

FIG. 6A to FIG. 6C are side views, each illustrating an assembled state of the support bracket 22, the rotation bracket 24, and the main power spring 50. In FIG. 6A to FIG. 6C, the angle formed between the two end portions 50A, 50B of the main power spring 50 is 80° or less. Accordingly, the main power spring 50 attempts to return to its original shape, biasing the rotation bracket 24 so as to rotate in the direction indicated by the arrow N (a direction away from the floor 12) about the rotation axis (axis L) of the rotation bracket 24.

Note that FIG. 6A illustrates the state prior to the seat body 40 springing up illustrated in FIG. 3A (double-dotted dashed lines, rotation angle θ=0°), FIG. 6C illustrates the state after the seat body 40 has sprung up illustrated in FIG. 3A (solid lines, rotation angle θ=80°), and FIG. 6B illustrates an intermediate state (rotation angle θ=30°).

Spiral Spring

As illustrated in FIG. 4, the spiral spring 70 is a spiral spring configured by winding a strap shaped steel member such that its diameter becomes progressively smaller from the outside toward the inside. The spiral spring 70 is attached to the support bracket 22 through a fixing member 72 that is fixed to a side face of the flange 22F of the fixed support bracket 22.

As illustrated in FIG. 6A, the spiral spring 70 is formed with an engagement portion 70A bent around at an inside end portion of the spiral shape, and an engagement portion 70B bent around at an outside end portion of the spiral shape. The fixing member 72 is formed with an engagement tab 72A extending in a circumferential direction about the axis L (center line of the rotation pin 23, see FIG. 5), and an engagement tab 72B extending in a circumferential direction about the axis L further to a radial direction outside than the engagement tab 72A as viewed along the axis L.

The engagement portion 70A of the spiral spring 70 is engaged with the engagement tab 72A of the fixing member 72, and the engagement portion 70B of the spiral spring 70 is engaged with the engagement tab 72B of the fixing member 72, thereby placing the spiral spring 70 between the engagement tab 72A and the engagement tab 72B of the fixing member 72 in a radial direction centered on the axis L. The spiral spring 70 is thereby fixed to the fixing member 72.

A resistance force transmission member 74 is attached to the flange 24F of the rotation bracket 24 that is coupled to the support bracket 22. An engagement tab 74B is provided to the resistance force transmission member 74 so as to extend around a circumference C centered on the axis L. The engagement portion 70B of the spiral spring 70 is disposed on an extension line of the engagement tab 74B along the circumference C.

As illustrated in FIG. 6A, FIG. 6B, and FIG. 6C, the resistance force transmission member 74 rotates together with the rotation bracket 24 about the axis L. The spiral spring 70 and the resistance force transmission member 74 do not engage with each other between the state illustrated in FIG. 6A and the state illustrated in FIG. 6B, namely in a state in which the rotation angle of the rotation bracket 24 is 0° or greater but less than 30°.

The engagement tab 74B of the resistance force transmission member 74 engages with the engagement portion 70B of the spiral spring 70, thereby winding the spiral spring 70 tighter, between the state illustrated in FIG. 6B and the state illustrated in FIG. 6C, namely in a state in which the rotation angle of the rotation bracket 24 is 30° or greater. A force thereby acts on the rotation bracket 24 against the biasing force of the main power spring 50.

Note that in a state in which the rotation angle of the rotation bracket 24 is less than 30°, of gravity P acting on the center of gravity G of the seat body 40 illustrated in FIG. 3A, a component force PW in a direction along the rotation direction of the rotation bracket 24 is smaller than the rotation force from the main power spring 50. The seat body 40 therefore rotates in the direction illustrated by the arrow N.

The component force PW becomes smaller as the rotation angle of the rotation bracket 24 becomes larger. In the present exemplary embodiment, in a state in which the rotation angle of the rotation bracket 24 is 30° or greater, the component force PW is less than a predetermined value. In the present exemplary embodiment, in this state, resistance force from the spiral spring 70 acts, supplementing the resistance force resisting the rotation force of the main power spring 50.

Note that in a state in which the rotation angle of the rotation bracket 24 is 30°, the rotation force from the main power spring 50 is balanced out by the combined force of the component force PW of the center of gravity G of the seat body 40 and the resistance force of the spiral spring 70. The "predetermined value" of the component force PW is set as appropriate based on the rotation force of the main power spring 50, the spring resistance of the spiral spring 70 employed, and the like.

In a state in which the rotation angle of the rotation bracket 24 is 50° or greater, the center of gravity G of the seat body 40 illustrated in FIG. 3A is positioned further toward the vehicle front (arrow FR side) than the axis L, this being the center of rotation. In FIG. 3A, the center of gravity G illustrated by the black circle is the position of the center of gravity in a state in which the rotation angle of the rotation bracket 24 is 80°, and the center of gravity G illustrated by the white circle is the position of the center of gravity in a state in which the rotation angle of the rotation bracket 24 is 30°.

Rotary Damper

As illustrated in FIG. 1, out of the pair of brackets 20 provided below the seat body 40, the rotary damper 60 is attached to the bracket 20 to which the spiral spring 70 is not attached. The rotary damper 60 is fixed to the flange 22F of the support bracket 22 instead of the spiral spring 70, the fixing member 72, and the resistance force transmission member 74 illustrated in FIG. 5.

The rotation pin 23 of the bracket 20 to which the rotary damper 60 is attached rotates axially about the axis L inside the through hole 22H, accompanying rotation of the rotation bracket 24. The rotation pin 23 is inserted into and fixed to the rotary damper 60, such that rotation force of the rotation bracket 24 is transmitted to the rotary damper 60.

A viscous fluid is housed inside the rotary damper 60. The viscous fluid exhibits viscous resistance of a constant magnitude (constant torque) with respect to rotation force transmitted from the rotation bracket 24 when the rotation bracket 24 transitions from the state illustrated in FIG. 6A (the state prior to the seat body 40 springing up, illustrated by double-dotted dashed lines in FIG. 3A) to the state illustrated in FIG. 6C (the state after the seat body 40 has sprung up, illustrated by solid lines in FIG. 3A), namely when the seat body 40 springs up. The viscous fluid thus reduces the rotation speed of the rotation bracket 24.

On the other hand, when the rotation bracket 24 moves from the state illustrated in FIG. 6C to the state illustrated in FIG. 6A, namely when the seat body 40 returns from a sprung-up state to its original state, the viscous fluid does not exhibit viscous resistance, and the rotary damper 60 does not affect the rotation speed of the rotation bracket 24. Namely, the rotary damper 60 is configured as a unidirectional damper that generates resistance torque with respect to rotation of the rotary damper 60 in one direction.

Operation and Advantageous Effects

In the vehicle seat 10 according to the exemplary embodiment of the present disclosure, the main power spring 50 illustrated in FIG. 4 biases the rotation bracket 24 so as to rotate about the axis L in the direction illustrated by the arrow N (in the direction away from the floor 12).

As illustrated in FIG. 1 and FIG. 2, the rear end portion 32B of the lower rail 32 is locked to the floor 12 by the lock member 80, and the front end portions 32A of the lower rails 32 are fixed to the rotation brackets 24. In this state, spring force of the main power spring 50 is stored, such that the seat body 40 is biased in the direction of the arrow N illustrated in FIG. 3A.

In more detail, over a range from the state prior to the seat body 40 springing up (double-dotted dashed lines) to the state after the seat body 40 has sprung up (solid lines) illustrated in FIG. 3A, namely over a range in which the rotation angle θ of the seat body 40 is $0° \leq \theta \leq 80°$, the seat body 40 is biased so as to rotate in the direction away from the floor 12 (direction to spring up toward the vehicle front) about the axis L.

Accordingly, the seat body 40 is easily rotated when springing up when the seat body 40 is at the rearmost position.

In the state prior to springing up, when the seat body 40 is at the frontmost position illustrated in FIG. 3B, the center of gravity G of the seat body 40 is positioned the amount 6 further toward the front than the center of gravity G when the seat body 40 is at the rearmost position. Accordingly, the moment of force required for the seat body 40 to spring up about the axis L is smaller than when the seat body 40 is at the rearmost position. Accordingly, the seat body 40 is more easily rotated than when the seat body 40 is at the rearmost position.

In the vehicle seat 10 according to the exemplary embodiment of the present disclosure, the rotary damper 60 illustrated in FIG. 1 and FIG. 2 reduces the rotation speed of the rotation bracket 24 over a range from a state prior to the seat body 40 springing up (double-dotted dashed lines) to a state after the seat body 40 has sprung up (solid lines) illustrated in FIG. 3A and FIG. 3B, namely over a range in which the rotation angle θ of the seat body 40 is $0° \leq \theta \leq 80°$. Moreover, the speed reduction mechanism configured by the rotary damper 60 only acts when the seat body 40 springs up.

Accordingly, the rotary damper 60 reduces the rotation speed of the seat body 40 as it springs up over the range in which the rotation angle θ of the seat body 40 is $0° \leq \theta \leq 80°$.

Moreover, in the vehicle seat 10 according to the exemplary embodiment of the present disclosure, due to the spiral spring 70 illustrated in FIG. 6A to FIG. 6C, resistance force from the spiral spring 70 is applied so as to act against the rotation force from the main power spring 50 in a state in which the rotation angle of the rotation bracket 24 is 30° or greater, namely in a state in which the rotation angle θ of the seat body 40 illustrated in FIG. 3A and FIG. 3B is in the range of $30° \leq \theta \leq 80°$. This resistance force acts on the seat body 40 in the direction indicated by arrow M about the axis L (direction approaching the floor 12, opposite direction to the arrow N direction) as the seat body 40 springs up.

Accordingly, the spiral spring 70 reduces the rotation speed when the rotation angle θ of the seat body 40 is in the range $30° \leq \theta \leq 80°$ as the seat body 40 springs up.

Figure 7:
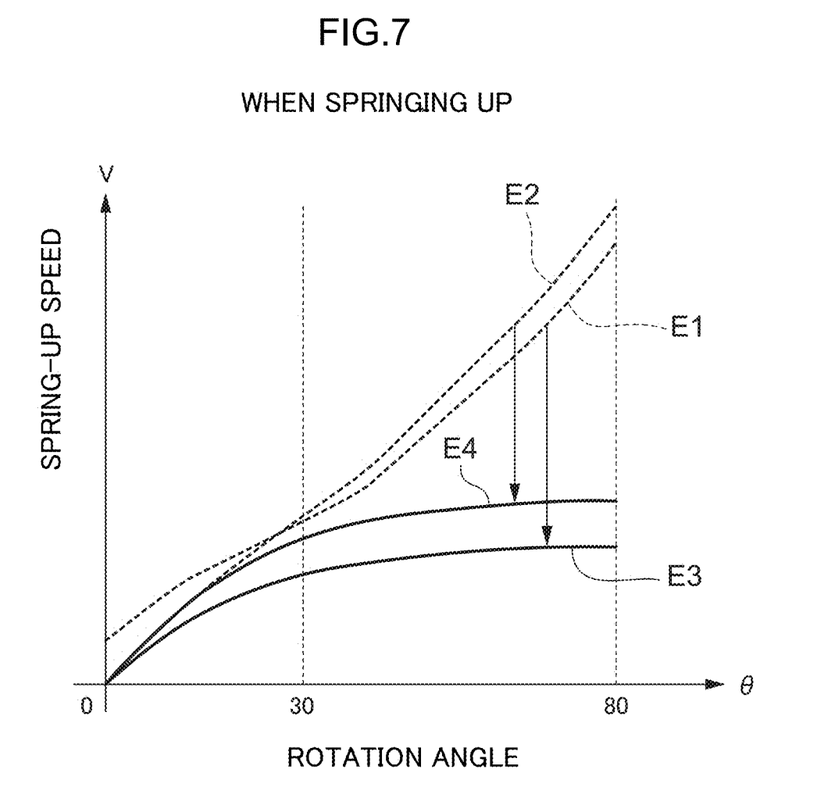
FIG. 7 is a graph illustrating a relationship between the rotation angle and spring-up speed of a seat body of a vehicle seat according to an exemplary embodiment of the present disclosure compared against a comparative example in which a rotary damper is not provided.

FIG. 7 illustrates a relationship between the rotation angle θ of the seat body 40 and the spring-up speed V of the seat body 40. In FIG. 7, the spring-up speed of the seat body 40 at the rearmost position and the frontmost position in cases in which "the rotary damper 60 is not employed (comparative example)" is respectively illustrated by the curves E1 and E2, and the spring-up speed of the seat body 40 at the rearmost position and the frontmost position in cases in which "the rotary damper 60 is employed" is respectively illustrated by the curves E3 and E4.

As illustrated in FIG. 7, both when the seat body 40 is at the rearmost position and when the seat body 40 is at the frontmost position, the spring-up speed is reduced over the range $0° \leq \theta \leq 80°$, in which the rotary damper 60 acts. The speed reduction effect is particularly large over the range $30° \leq \theta \leq 80°$, in which both the rotary damper 60 and the spiral spring 70 act.

As described above, in the vehicle seat 10 according to the exemplary embodiment of the present disclosure, the seat body 40 is suppressed from springing up too energetically. Accordingly, both when the seat body 40 is at the rearmost position (FIG. 3A) and when the seat body 40 is at the frontmost position (FIG. 3B), the seat body 40 is easily to rotate, and there is no need for an occupant to apply a steadying hand in order to control the spring-up speed as the seat body 40 springs up.

In the vehicle seat 10 according to the exemplary embodiment of the present disclosure, the resistance force of the spiral spring 70 also acts when the seat body 40 returns to its original state after springing up. Since this resistance force acts in the opposite direction to that of the main power spring 50, this resistance force serves as an assisting force when the seat body 40 returns to its original state.

Figure 8:
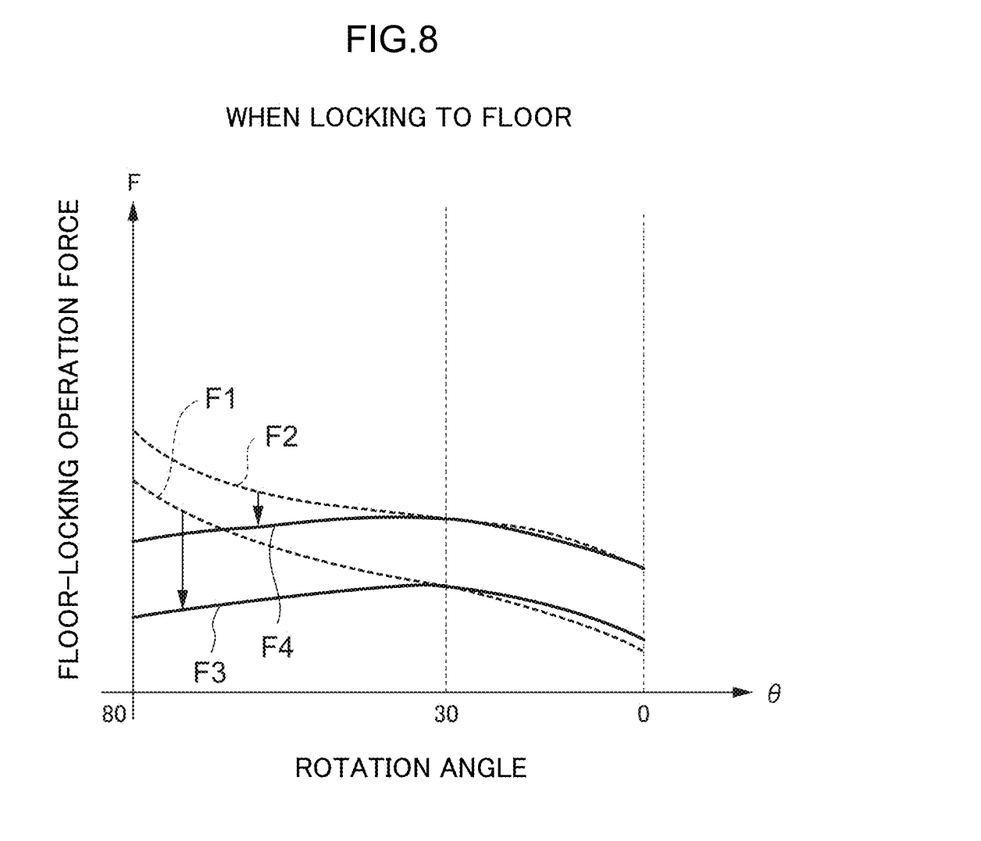
FIG. 8 is a graph illustrating a relationship between the rotation angle of a seat body and floor-locking operation force of a vehicle seat according to an exemplary embodiment of the present disclosure compared against a comparative example in which a spiral spring is not provided.

FIG. 8 illustrates a relationship between the rotation angle θ of the seat body 40 and floor-locking operation force F of the seat body 40. The floor-locking operation force is the force required to rotate the seat body 40 in the opposite direction to the spring-up direction of the main power spring 50 so as to return the seat body 40 from a sprung-up state to its original state.

In FIG. 8, the floor-locking operation force at the rearmost position and the frontmost position in cases in which "the spiral spring 70 is not employed (comparative example)" is respectively illustrated by the curves F1 and F2, and the floor-locking operation force at the rearmost position and the frontmost position in cases in which "the spiral spring 70 is employed" is respectively illustrated by the curves F3 and F4.

As illustrated in FIG. 8, both when the seat body 40 is at the rearmost position and when the seat body 40 is at the frontmost position, the floor-locking operation force is reduced over the range $30° \leq \theta \leq 80°$ in which the spiral spring 70 acts.

As described above, in the vehicle seat 10 according to the exemplary embodiment of the present disclosure, the seat cushion is easily rotated when being returned to its original state.

Moreover, in the vehicle seat 10 according to the exemplary embodiment of the present disclosure, the range in which the resistance force of the spiral spring 70 acts is configured as the range in which the rotation angle of the rotation bracket 24 and the seat body 40 is 30° or greater.

Of the gravity P acting on the center of gravity G of the seat body 40 illustrated in FIG. 3A, the component force PW in a direction along the rotation direction of the rotation bracket 24 becomes smaller as the rotation angle of the rotation bracket 24 becomes larger. In the present exemplary embodiment, the resistance force of the spiral spring 70 acts in a state in which the rotation angle of the rotation bracket 24 is 30° or greater, thereby supplementing the resistance force resisting the rotation force of the main power spring 50. The seat body 40 is thereby easily rotated when being returned to its original state.

Moreover, over a range in which the rotation angle of the rotation bracket 24 and the seat body 40 is 50° or greater, the center of gravity G of the seat body 40 illustrated in FIG. 3A is positioned further to the vehicle front side (arrow FR side) than the axis L, this being the center of rotation. When the center of gravity G of the seat body 40 is at a position further toward the vehicle front side than the axis L, gravity acting on the seat body 40 biases the seat body 40 such that the seat body 40 attempts to tip over toward the vehicle front side.

Namely, over a range in which gravity biases the seat body 40 such that the seat body 40 attempts to tip over toward the vehicle front side, resistance force of the spiral spring 70 acts in a direction to push the seat body 40 back toward the vehicle rear side. The seat body 40 is thus easy to rotate when being returned to its original state.

Note that in the present exemplary embodiment, resistance force of the spiral spring 70 acts against the rotation force of the main power spring 50 both when the seat body 40 is springing up and when the seat body 40 is being returned from the sprung up state to its original state. However, the present disclosure is not limited to such an exemplary embodiment.

For example, resistance force may be made to act only when returning the seat body 40 from the sprung-up state to the original state. In such cases, even though resistance force from the spiral spring 70 does not act when the seat body 40 springs up, the speed reduction effect of the rotary damper 60 enables the seat body 40 to be suppressed from springing up too suddenly.

Moreover, the spiral spring 70 may be omitted. Even in such cases, the seat body 40 can still be suppressed from springing up too suddenly due to the speed reduction effect of the rotary damper 60.

In the present exemplary embodiment, the constant-torque unidirectional rotary damper 60 is employed as the speed reduction member. However, embodiments of the present disclosure are not limited thereto. For example, a spiral spring in which resistance force acts according to the rotation angle of the seat body 40 may be employed. In more detail, the effect of reducing the spring-up speed of the seat body 40 can be enhanced by employing a spiral spring in which a larger resistance force acts over a range in which the rotation angle of the seat body 40 is large (the range in which the spring-up speed of the seat body 40 is high in FIG. 7, for example $50° \leq \theta \leq 80°$).

Moreover, in the present exemplary embodiment, the center of gravity G of the seat body 40 is further toward the seat front side than the axis L over the range in which the rotation angle of the seat body 40 is 50° or greater. Accordingly, the range over which the spiral spring 70 exhibits resistance force may be set to the range in which the rotation angle of the seat body 40 is 50° or greater. So doing enables an efficient increase in the effect of reducing the rotation force of the seat body 40 over the range in which the rotation angle of the seat body 40 is large.

Moreover, in cases in which a threshold value for the rotation angle where the center of gravity G of the seat body 40 is further to the seat front side than the axis L is an angle other than 50° (for example 60°), configuration may be made such that resistance force of the spiral spring 70 acts over a range from this angle upwards (for example a range from 60° upwards).

A first aspect of the present disclosure is a vehicle seat comprising: a support bracket that is provided at a floor of a vehicle; a rotation bracket that is rotatably coupled to the support bracket; a lock member that is provided at the floor; a lower rail, a front end portion of the lower rail being fixed to the rotation bracket and a rear end portion of the lower rail being locked by the lock member; an upper rail that is attached to the lower rail so as to be capable of sliding in a vehicle front-rear direction; a seat body that is fixed to the upper rail; a rotation force application member that applies rotation force to the rotation bracket such that the lower rail rotates in a direction in which the seat body springs up; and a speed reduction member that reduces a rotation speed of the rotation bracket in a case in which the seat body springs up.

In the vehicle seat of the first aspect, the upper rail, to which the seat body is fixed, is attached to the lower rail so as to be capable of sliding. The seat body is thus capable of sliding in the vehicle front-rear direction.

The front end portion of the lower rail is fixed to the rotation bracket that is rotatably coupled to the support bracket. The rear end portion of the lower rail is locked by the lock member. When the locking of the lock member is released, the lower rail becomes capable of rotating together with the rotation bracket, and is capable of rotating in the direction in which the seat body springs up.

The rotation force application member applies rotation force to the rotation bracket such that the lower rail rotates in the direction in which the seat body springs up. This thereby enables the seat body to be rotated with a light force, even when the seat body is positioned toward the vehicle rear, than in a vehicle seat not provided with a rotation force application member.

The speed reduction member reduces the rotation speed of the rotation bracket when the seat body springs up. The seat body therefore rotates slowly.

A second aspect of the present disclosure is the vehicle seat of the first aspect, further comprising a rotation force reduction member that reduces the rotation force applied by the rotation force application member over a predetermined range in a case in which the rotation bracket rotates in a direction opposite to the direction in which the seat body springs up.

In the vehicle seat of the second aspect, when the rotation bracket rotates in the opposite direction to the direction in which the seat body springs up, namely when returning the seat body to a position for sitting, the rotation force reduction member reduces the rotation force applied by the rotation force application member over the predetermined range. This thereby enables the seat body to be returned to the position for sitting with a light force.

A third aspect of the present disclosure is the vehicle seat of the second aspect, wherein the rotation force reduction member reduces the rotation force within a range in which, of gravity acting on the seat body, a component force along a rotation direction of the rotation bracket is less than a predetermined value.

Of the gravity acting on the seat body, the component force along the rotation direction of the rotation bracket (a component force resisting the rotation force of the rotation force application member) becomes smaller as the rotation angle of the rotation bracket becomes larger. In the vehicle seat of the third aspect, the rotation force reduction member reduces the rotation force over the range in which, of the gravity acting on the seat body, the component force along the rotation direction of the rotation bracket is less than the predetermined value. Namely, the rotation force reduction effect can be supplemented over a range in which a rotation force reduction effect on the seat caused by gravity acting on the seat body becomes small.

A fourth aspect of the present disclosure is the vehicle seat of the second aspect or the third aspect, wherein: a pair of the support brackets, a pair of the rotation brackets, a pair of the lower rails, and a pair of the upper rails are respectively provided along a width direction of the seat body; the rotation force application member is provided at each of the pair of rotation brackets; and the speed reduction member is provided at a first rotation bracket of the rotation brackets and the rotation force reduction member is provided at a second rotation bracket of the rotation brackets, the first rotation bracket and the second rotation bracket being symmetrically arranged with respect to a center line in the width direction of the seat body.

In the vehicle seat of the fourth aspect, the speed reduction member and the rotation force reduction member are provided at symmetrical positions to each other about the center line in the width direction of the seat body. Accordingly, a position where torque is generated to reduce rotation force, and a position where torque is generated to reduce the rotation speed, have a well-balanced placement with respect to the center line in the width direction of the seat body. This results in smoother movement of the seat body.

Advantageous Effects of Invention

The vehicle seat according to the present disclosure enables a seat body to be rotated with a light force, regardless of the position of the seat body.

What is claimed is:

1. A vehicle seat comprising:
   a support bracket that is provided at a floor of a vehicle;
   a rotation bracket that is rotatably coupled to the support bracket;
   a lock member that is provided at the floor;
   a lower rail, a front end portion of the lower rail being fixed to the rotation bracket and a rear end portion of the lower rail being locked by the lock member;
   an upper rail that is attached to the lower rail so as to be capable of sliding in a vehicle front-rear direction;
   a seat body that is fixed to the upper rail;
   a rotation force application member that applies rotation force to the rotation bracket such that the lower rail rotates in a direction in which the seat body springs up;
   a speed reduction member that reduces a rotation speed of the rotation bracket in a case in which the seat body springs up; and
   a rotation force reduction member that reduces the rotation force applied by the rotation force application member by engaging with the rotation force application member within a predetermined rotation angle range in a case in which the rotation bracket rotates in a direction opposite to the direction in which the seat body springs up.

2. The vehicle seat of claim 1, wherein the rotation force reduction member reduces the rotation force within a range in which, a component force is less than a predetermined value, wherein the component force is a force that is along a rotation direction of the rotation bracket in a force of gravity acting on the seat body.

3. The vehicle seat of claim 1, wherein:
   a pair of the support brackets, a pair of the rotation brackets, a pair of the lower rails, and a pair of the upper rails are respectively provided along a width direction of the seat body;
   the rotation force application member is provided at each of the pair of rotation brackets; and
   the speed reduction member is provided at a first rotation bracket of the rotation brackets and the rotation force reduction member is provided at a second rotation bracket of the rotation brackets, the first rotation bracket and the second rotation bracket being symmetrically arranged with respect to a center line in the width direction of the seat body.

4. The vehicle seat of claim 1, wherein the rotation force application member includes a main power spring.

5. The vehicle seat of claim 1, wherein the speed reduction member includes a rotary damper.

6. The vehicle seat of claim 1, wherein the rotation force reduction member includes a spiral spring.

7. The vehicle seat of claim 1, wherein the rotation force reduction member is configured to engage with the rotation force application member at least when the rotation angle of the rotation bracket is 30° or greater.

* * * * *